S. S. CROCKER & A. WILCOX.
NUT-LOCKS.
No. 194,133.          Patented Aug. 14, 1877.
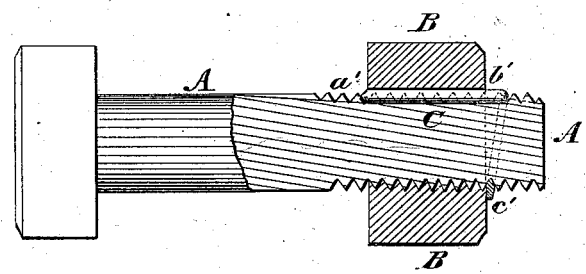
fig. 1.
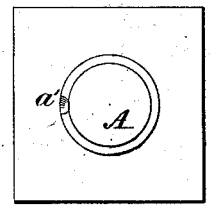 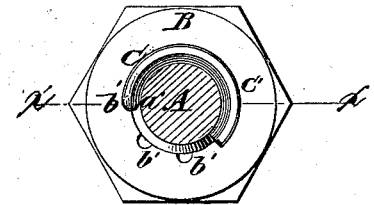
fig. 2.     fig. 3.
WITNESSES:          INVENTORS
Gustave Dieterich      S. S. Crocker.
J. H. Scarborough.    A. Wilcox.
                BY
                ATTORNEYS.

UNITED STATES PATENT OFFICE.

SILAS S. CROCKER AND ALBERT WILCOX, OF CLARENCE, IOWA.

IMPROVEMENT IN NUT-LOCKS.

Specification forming part of Letters Patent No. 194,133, dated August 14, 1877; application filed July 23, 1877.

*To all whom it may concern:*

Be it known that we, SILAS S. CROCKER and ALBERT WILCOX, of Clarence, in the county of Cedar and State of Iowa, have invented a new and useful Improvement in Nut-Locks, of which the following is a specification:

Figure 1 is a sectional view of a bolt and nut to which our improved lock has been applied. Fig. 2 is an end view of the bolt. Fig. 3 is a cross-section of the bolt, showing the nut and fastener in place.

Similar letters of reference indicate corresponding parts.

The object of this invention is to furnish an improved lock or fastening for the nuts of bolts upon railroad machinery and other machinery subject to a constant or intermittent jarring, to prevent the said nuts from working loose, and which shall be simple in construction, easily and quickly applied and removed, and reliable in use.

The invention consists in the lock, made of spring-brass wire, having its outer part bent to form a spiral spring, in combination with the grooves formed in the bolt and nut across their threads, as hereinafter fully described.

A represents a bolt, upon one side of which, across its threads, is formed a longitudinal groove, $a'$.

B represents the nut, in the inner surface of which, across its threads, is formed one, two, or more grooves, $b'$.

C is a round wire made of spring-brass, of such a size as to fit loosely in the grooves $a'$ $b'$ of the bolt A and nut B when said grooves are brought together, so that it can be easily put in and taken out, and so that it cannot rust fast.

The outer part $c'$ of the spring-wire C is bent at such a spiral as to coincide with the pitch of the threads of the bolt A, is made of such a length as to extend more than half-way around the said bolt A, and is curved upon a smaller circle than the circumference of the bolt, so that it may fit snugly into the threads of the bolt.

With this construction, when the nut B is screwed up and one of the grooves $b'$ brought opposite the groove $a'$ of the bolt A, the straight part of the lock or fastener C is inserted in the hole formed by the said grooves $a'$ $b'$, and the spiral spring $c'$ of said lock is sprung into the thread of the said bolt A.

With this lock it is impossible for any jarring to loosen or stir the nut B.

The lock is detached by pressing against the end of the spiral spring $c'$ with a pointed instrument, and thus forcing the said spiral back and out, when the straight part of said lock can be readily withdrawn from the grooves $a'$ $b'$, and the nut can be turned off.

Having thus described our invention, we claim as new and desire to secure by Letters Patent—

The lock C, made of spring-brass wire, having its outer part bent to form a spiral spring, $c'$, in combination with the grooves $a'$ $b'$, formed in the bolt A and nut B across their threads, substantially as herein shown and described.

SILAS S. CROCKER.
ALBERT WILCOX.

Witnesses:
T. O. MANNING,
GEO. E. WILCOX.